United States Patent
Bozoyan

[15] 3,686,970
[45] Aug. 29, 1972

[54] DIGITAL CONTROL DEVICES WITH MECHANICAL CONVERSION

[72] Inventor: Edward Bozoyan, 1812 West St., Union City, N.J. 07087

[22] Filed: July 27, 1970

[21] Appl. No.: 58,500

[52] U.S. Cl. .......................... 74/479, 91/1, 60/54.5, 137/625.63
[51] Int. Cl. ............................................. G05g 11/00
[58] Field of Search ....137/625.63, 625.64; 235/200; 74/479; 91/1; 60/54.5

[56] References Cited

UNITED STATES PATENTS

| 2,889,109 | 6/1959 | O'Brien | 235/200 |
| 2,960,098 | 11/1960 | Watrous | 235/200 X |
| 3,174,529 | 3/1965 | Grosselfinger et al | 235/200 UX |
| 3,384,122 | 5/1968 | Harpman | 137/625.64 |
| 2,881,634 | 4/1959 | Keehn et al | 74/479 |

FOREIGN PATENTS OR APPLICATIONS

| 1,235,484 | 5/1960 | France | 137/625.66 |

*Primary Examiner*—Henry T. Klinksiek

[57] ABSTRACT

A digital actuator comprising a combination of small lever arms in conjunction with a series of on/off torque motors constructed and arranged to reduce the stroke ratings of motors to binary-weighted displacements and add them up to one another; a hydraulically controlled modified sliding spool valve having a shift arm and a positional bellows at each end; a control pressure bellows to receive the total of binary-weighted displacements and proportionally shift the spool by means of one of its shift arms via either positioner bellows.

13 Claims, 7 Drawing Figures

INVENTOR.
EDWARD BOZOYAN

INVENTOR.
EDWARD BOZOYAN

Patented Aug. 29, 1972

INVENTOR.
EDWARD BOZOYAN

DIGITAL CONTROL DEVICES WITH MECHANICAL CONVERSION

SUMMARY OF THE INVENTION

This invention relates to proportional control systems and is particularly concerned with the provision of a new digital actuator capable of accepting digital command signals and mechanically converting them to analog linear movement. The invention is also concerned with a new spool driving concept utilizing the new actuator.

According to the present invention, there is provided a digital actuator including a series of on/off-type power units, such as torque motors, operated by digital signals, and a coacting lever network comprising small lever arms constructed and arranged in pseudo-crisscross manner to reduce the stroke ratings of the motors to discrete binary-weighted displacements which are automatically added to one another to form a total displacement precisely proportional to a digital input information.

There is further provided a modified four-way sliding master spool having (a) a shift arm mounted at each end driven proportionally by said total displacement, (b) a control pressure bellows developing hydraulic pressure and spurt according to the magnitude of the total displacement, (c) a mini directional valve, and (d) a pair of right and left positioner bellows.

At a digital input command, the hydraulic pressure and spurt are developed, and the directional valve acts to direct the spurt into one or the other of the positioner bellows, thus shifting the master spool to the right or the left. The modified master spool, paralleling the proportional displacement of the digital actuator, and as the actuator itself are both readily compatible with digital command sources.

STATE-OF-THE-ART AND OBJECTS

The increasing, widespread interest in digital actuators and digital control systems during the past decade has reached a peak. Unfortunately, the high cost, the imperfect development, and the complexity of these divices have not permitted their general adoption. Digital servovalves and actuators developed up to this time have not met the prime requisites of basic simplicity and high reliability. The great variety of stepping mechanisms, as the natural digital actuators, do not exhibit a positive, promising avenue for the solution of the problem. The nozzle flapper hydraulic applifier, which has become the standard first stage of most electrohydraulic servovalves, is no longer practical here.

It is an important object of the present invention, therefore, to provide an accurate and inexpensive digital actuator having thousands of discrete positions without the use of intermediate, delicate, and complex electronic or electrical devices.

Another important object of the present invention is to provide a digital actuator utilizing mechanical digital-to-analog (D-A) conversion consisting of a simple combination of small lever arms arranged in pseudo-crisscross manner and a decade of miniature-size electrical on/off power units, thus providing an inexpensive electromechanical actuator which is virtually insensitive to electrical hysteresis in its power portion and has in its conversion portion a simple and rigid as well as highly accurate mechanical structure that is insensitive to the entirety of variables (temperature, pressure, flow, contamination, noise, humidity, and all kinds of electrical forces and signals, as well as radiation and gravity). Rated actuating forces are amplified by the lever arms, and thus fluid components and circuitry can be dispensed with.

A further object of the present invention is to provide a new technique for driving the four-way sliding spool, utilizing a pair of counterpoising and pressure-responsive drive elements which are contained in the spool housing and are activated by the displacements of the new digital actuator.

A digital technique well known in the art employs several sylinders in series, as an open-loop system, forming a multi-position device. This system is very simple and has very high potential accuracy. However, it is bulky since it requires a large number of cylinders to achieve fine resolution. Several inventions have been made, in this country and abroad, to reduce the physical bulk of this system. The present invention realizes the potential advantages of the multi-position system while reducing to a single and yet small pressure chamber the plurality of cylinders conventionally demanded by this type of system. It is therefore an additional object of the present invention to provide an open-loop system having but one small double-ended pressure chamber assembly for developing control power for either pilot or power operation; a series of on/off switching power units to depress at both ends of the pressure chamber; and coacting small lever network, reducing the stroke ratings of the power units to binary-weighted displacements and applying them to the end(s) of the pressure chamber as a precisely definite sum or total of displacements. Any desired amount of control power can be developed by the pressure chamber and applied directly into a load-actuator or used to control a spool displacement to achieve fluid amplification.

It is also within the contemplation of the present invention to provide a truly simple and inexpensive digital control system which is amenable to hazardous environments such as temperature extremes, and is highly accurate and reasonably lightweight, for general adoption in both military and commercial applications.

Other objects and many of the attendant advantages of this invention will be readily appreciated as the same becomes better understood by reference to the following detailed description when considered in connection with the accompanying drawings.

DESCRIPTION OF PREFERRED EMBODIMENTS

Figure 1:
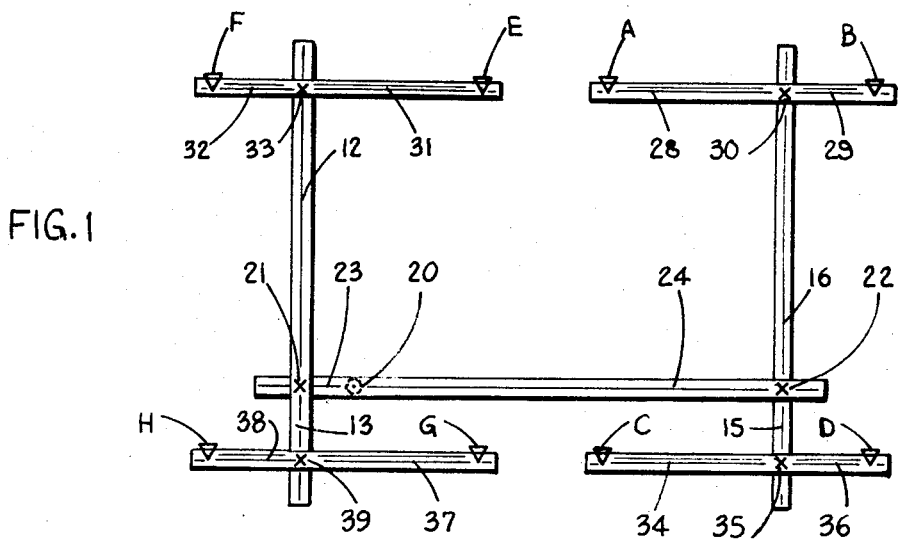
FIG. 1 is a top view of the lever arms showing how similar stroke ratings may be reduced to binary-weighted displacements and add up to one another.

Unlike prior inventions for converting digital input to analog output, the present invention employs a purely mechanical converting means. Although the principle of this mechanical converting means, the lever principle, is as old as civilization, its present application and the technique of utilization are entirely new. In the preferred form of the invention, the construction and arrangement of the combination of levers somewhat resemble the type face of an extended Karnak aitch(H) as illustrated in FIG. 1. In order to distinguish between the levers, these are named according to a functional simulation of the drafting implements attached to the horse-drawn carriage. In FIG. 1, the numerals 28–29, 31–32, 34–36, and 37–38 are singletree-type levers. Numerals 12–13 and 15–16 are doubletree-type levers, and 23–24 is the main summing lever member. Singletree 31–32 rests freely on the upper end of the doubletree 12–13 and it is in direct physical contact at the point of support and transmission 33, and it is in engagement with two miniature power units (not shown) at receiving points E and F. As a typical example, point 33 is the selected transmission point on the transmission side of lever 31–32, and at the same time it is the receiving point on the receiving side of lever 12–13. As these two points meet each other in the drawing, only one reference number is given to both. The power units preferably may be small on/off torque motors, or suitable solenoids, or cam lobes, etc. The present invention does not relate to the actuating means; suffice it to say, for the purposes of this specification, that two small power units are employed to depress downwardly on the singletree 31–32 (FIG. 2) at points E and F. This may be direct engagement or through the medium of linkage such as the U-shaped rod 42 (FIG. 2) mounted loosely on member 31–32 at the point of depression F. Theoretically, point 33 binary-wise divides the effective length of lever 31–32 into two unequal segments: the major segment 31 and the minor segment 32. The same kind of designation is used for all the levers in order to facilitate the understanding of their operation.

Numeral 40 (FIG. 2) designates a backing-plate serving operatively to support all the constituent members of the mechanism. A number of holes 41 are provided in plate 40 to receive the extended legs of rods 42. These rods 42 are permitted a slight forward and backward play, but not a sidewise movement. Hence, U-shaped connecting rods 42 act primarily as guides and supports at each end of the singletree-type foremost levers 28–29, 31–32, 34–36, and 37–38 by preventing the latters from tilting away from the axis of the former. Each rod 42 is provided with a follower 43 adjustably fastened on its legs by the screws 48 thereby it actuates one end of a foremost lever.

A small on/off type torque motor 17 (diagrammatically shown in FIG. 2) is provided for each end of the singletrees to engage with the follower 43 or directly with each of the receiving points A, B, C, D, E, F, G, and H. Thus, any end, or any combination of singletree ends, or all of the ends together may be depressed downwardly at the full stroke rating of the motors 17. These stroke ratings are reduced to binary-weighted displacements, added to one another, and applied to a final common output point 20 on the main summing lever member 23–24, as described in detail in the following paragraphs.

Each of the singletree levers rests on its associated double-tree member at a transmission point located on one-third and/or two-thirds of its effective length (as 30, 35, 33, and 39 in FIG. 1). In other words, the length of the major segment 31 is exactly twice as long as segment 32; lever segment 28 is twice that of 29; 34 is twice that of 36; and 37 is twice that of 38. The arrangement is such that all the ends of the singletree foremost levers are free to be depressed downwardly but are prevented from moving away or receding from the backing plate 40. This is accomplished by the U-shaped connecting rods 42 or other suitable means.

In the operation of this device, if, for example, a quartet of motors 17 having a uniform stroke rating of 1.35 mm (millimeters), have been adopted in the right half of the device, the results are as follows: when end point A is depressed, lever 28–29 is swung about the now fulcral point B, and will transmit its depression to the receiving point 30 on the receiving side of the subsequent intermediary lever 15–16. This stroke, however, is decreased by a factor equal to the ratio of the entire length of lever 28–29 to the length of its minor segment 29, that is 3/1. Thus, a depression at receiving and end point A results in a depression of 1.35·3=0.45 mm at point 30. If instead of point A point B is depressed, lever 28–29 will swing about the now fulcral point A, and the resulting downward stroke at point 30 will be twice as great as it would be if point A were depressed, that is 1.35·3/2=0.90mm. If both receiving point A and point B are depressed, then the entire lever 28–29 is shifted down the full stroke, that is 1.35 mm. It is of importance that the 1.35 mm stroke is the sum of the results transmitted by point A and by point B ; that is 1.35 mm=0.45+0.90 thus the reduced strokes of points A and B are complementary to each other.

Intermediary doubletree-type lever 15–16, in turn, transmits the depressions it receives to the main summing lever member 23–24 at point 22. Segment 15 represents 1/5 of the length of lever 15–16, and segment 16 represents 4/5 of its length. Accordingly, doubletree 15–16 reduces the depression strokes of lever 28–29 by a factor of 5 and that of lever 34–36 by a factor of 5/4. Thus, the stroke at point A constitutes a precisely definite displacement of 1.35 (3×5)=0.09 mm at point 22. Correspondingly, that at point B is a precisely definite displacement of 1.35 (3/2×5)=0.18 mm, and that at points A and B a precisely definite displacement of 1.35·5=0.27 mm. By the same token, that at point C , 1.35(3×5/4)=0.36 mm ; that at D, 1.35 (3/2×)=0.72 mm ; that at C and D , 1.35·5/4=1.08 mm ; and that at the whole quartet A , B , C , and D will be a displacement of exactly 1.35 mm for point 22. The output summing lever 23–24 executes a final reduction in terms of the aforesaid values. Selected point 20 binary-wise divides the effective length of this lever into segments 23 and 24. The ratio of segment 24 to segment 23 is 8/1. Thus, it transmits the strokes of the right quartet to its final output point 20 by scaling them down by a factor of 9. The stroke at point A is finally reduced to a precisely definite displacement or depression of 0.099=0.01 mm . This is a reduction by a factor of 135, that is the stroke of 1.35 mm is divided by 135, and the discrete output stroke is 1.35135=0.01 mm, which is the depression unit in this example. The stroke at B is scaled down to two binary-weighted units, 0.189=0.02 mm ; that at C , to four binary units, 0.369=0.04 mm ; and that at D , to eight depression units, 0.729=0.08 mm .

In the left half of the device (FIGS. 1 and 2) up to point 21, the stroke reduction scale is the same binary reduction as that in the right half. A quartet of motors 17, having a linear stroke rating of 1.35 mm , could also be used in the left half. However, in order to have the 8/1 ratio at the output lever 23–24, a quartet of motors 17 having a uniform stroke rating of 2.70 mm has been adopted in the left half. Accordingly, the binary output result of each motor is as follows: that at point E is decreased by a factor of $3 \times 5 \times 9/8 = 135/8$, or 16(7/8), which gives the discrete output stroke of 2.70135/8= 0.16 mm (16 depression units); that at point F is reduced by a factor of $3/2 \times 5 \times 9/8 = 135/16$, or 8 7/16, which gives the discrete output stroke of 2.708 7/16=0.32 mm ; that at point G is scaled down by a factor of $3 \times 5/4 \times 9/8 = 135/32$, or 4 7/32, which gives the quotient of 2.70135/32=0.64 mm ; that at point H is decreased by a factor of $3/2 \times 5/4 \times 9/8 = 135/64$, or 2 7/64, which gives the quotient of 2.70135/64=1.28 mm, or 128 depression units, the maximum output strokes produced by an eight-motor device.

Considered by itself, the above-described mechanism (FIG. 1 and the lever portion of FIG. 2), constitutes a single-stage actuator employing mechanical digital-to-analog (D-A) conversion. This digital actuator can accept digital input signals and convert them directly to an analog output without any intermediate processing. The digital signals may be generated by a command source, such as a tape reader, a computer, or any other means that may be developed for them. It is of importance to note that the conversion is done purely and solely by means of small levers longitudinal. No electrical, hydraulic, or pneumatic elements are employed, and the device is thus substantially insensitive to temperature or any variable. As a result, there is no loss of motion, no impairment of accuracy whatsoever, during conversion. With its eight small power units the actuator can assume 256 discrete output positions, which constitute 256 discrete output strokes. Optionally, or if necessary, the actuator may have a host of discrete positions, (up to the sixteenth power of two, $2^{16}$), as will be described hereinafter.

Made full-scale, the above-described single-stage digital actuator may be used as an actuator and prime mover for driving and precisely positioning heavy loads directly. Inasmuch, however, as this prime mover-/actuator has limited application (having the capability of positioning a load in one direction only — such as lifting - while lacking the ability to stop the load or move it in the reverse direction), a pair of mover/actuators may be employed in a reciprocal arrangement, one for each direction.

This mover/actuator enjoys fundamental simplicity and high accuracy. It may be found welcome in very-high-temperature control systems inasmuch as it eliminates hydraulic amplification: firstly, it has several power units (eight on/off torque motors); secondly, actuation force-rates for its power units are amplified and summed through its lever network. When, for example, at point A the stroke of the motor is reduced by the factor of 135, its rated force is increased and amplified by substantially the same factor of 135. This means that only very small power units (motors) are required and the device will still deliver great power.

As a mover/actuator the present digital device would be better used in conjunction with two pressure-responsive positioners, a small directional valve, and a small accumulator. In this case, the load to be driven is controlled by one positioner at each end. The example given for this application is that of piloting a sliding spool (FIGS. 3 and 2), but it should be well understood that the present digital mover/actuator is capable of driving heavy loads purely by electrical power without the use of any pressurized fluid derived from a compressor.

Used as a pilot actuator for power valves, the present actuator could take any possible miniaturization, owing to its inherent power and to the small amount of control fluid that it has to displace. An example of piloting a four-way sliding spool and a new technique for driving the spool is given hereinafter.

Figure 2:
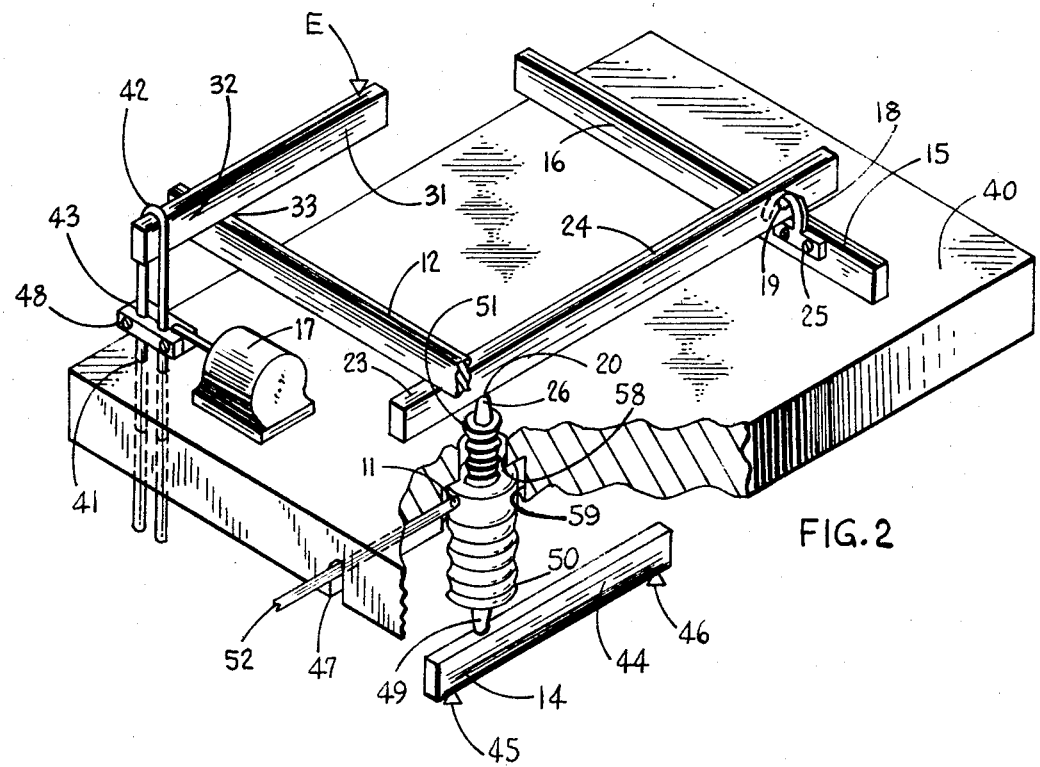
FIG. 2 is an isometric view of the primary or control stage of the present invention, some of the lever arms and other repeated parts being omitted for clarity.
Figure 4:
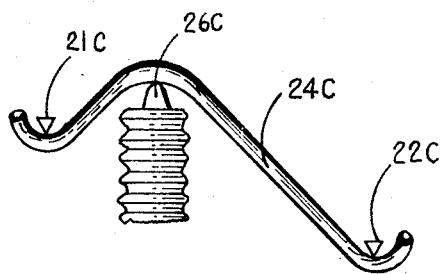
FIG. 4 is an isometric view of a modified lever arm which could replace the straight lever arm.

In FIGS. 1 and 2, the coacting levers are shown arranged in pseudo-crisscross manner and in right angle planes with respect to one another; however, they can be arranged in planes of other given angles and yet produce the same results. To obtain a physically compact structure and a low center of gravity, some of the levers may be freely underslung from the others. An example of that kind of suspension, doubletree lever 15–16 (FIG. 2), can be secured on lever 23–24 precisely at point 22 by a hook 18 engaged in a hole 19, hook 18 being fastened to minor segment 15 of lever 15–16 by screws 25.

Member 50–51 (FIG. 2) is a control pressure bellows assembly formed by a small diameter bellows 51 united, as by welding, to a larger diameter bellows 50, and it has a service port 11. Bellows assembly 50–51 is disposed transversely in a recessed hole 58 bored into the face of backing plate 40; being inserted from the underside, it rests on recess 59, passes through hole 58, and is secured to plate 40 by means not shown. The bellows is preferably terminated in dome-like caps 26 and 49 at its respective ends. A common hydraulic delivery line 52, extending through bore 47 in plate 40, is connected to service port 11 of bellows 50–51 and communicate with the united interiors of 51 and 50. Numerals 14–44 designate the lower output summing lever, with 45 and 46 fulcral receiving points. Lever 14–44 performs a function in the lower level of FIG. 2 similar to that of lever 23–24 in the upper level. If it is desired to obtain very numerous discrete output positions, for example, the sixteenth power of two ($2^{16}$= 65, 535), then the lever underneath plate 40 must be equipped similar to the upper level; that is, along with lever 14–44, two doubletree-type intermediary levers, four singletree-type foremost levers, and eight torque motors are required. The description and operation of this arrangement are similar to those of the upper level. If it is desired to obtain the twelfth power of two ($2^{12}=4,096$) discrete output positions, then lever 14–44 must be considered as a doubletree lever, thus establishing a segments ratio of four to one. In this case, two singletree levers and four torque motors must be employed with it. On the other hand, if it is desired to obtain the tenth power of two ($2^{10}=1,024$) discrete output positions, then lever 14–44 must be a singletree-type lever with only two torque motors employed with it, yielding a segments ratio of two to one.

Figure 3:
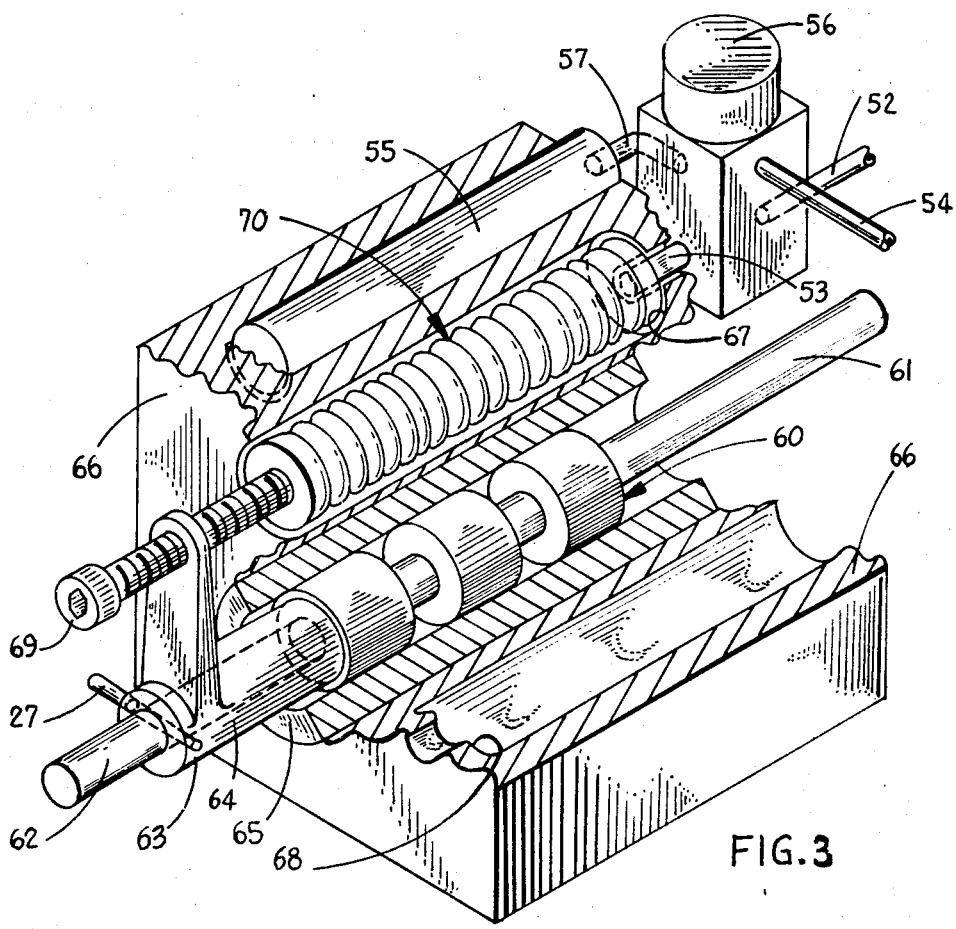
FIG. 3 is a cutaway view, partly in section, of a proportional control valve showing an improved four-way sliding spool in conjunction with one of the new shift arms mounted on its left end, one of the positioner bellows, and the drive accessories.

Referring now to FIG. 3, item 60 is an improved movable valve member, i.e., a four-way sliding spool having a right-hand shank 61 and a left-hand shank 62. Left shift arm 63 is mounted on spool shank 62, being first slidably positioned on shank 62 and them locked in place by pin 27. Shift arm 63 thus operates as an integral part of spool 60. Screw 69 is adjustably thread-mounted on 63. A like shift arm (not shown) is similarly mounted on right shank 61. Sleeve member 65 is shorter in length than conventional sleeves because there is no need for spool end chambers in the present design. Item 66 is a portion of a valve housing enveloping the sleeve; this housing has right and left side wall portions, 67 and 68, respectively.

Resting against wall 67 and extending paralled to the spool is upper positioner bellows 70. A similar lower positioner bellows (not shown) rests against wall 68 and also extends parallel to the spool. A miniature four-way, directional underlapped electro-hydraulic valve 56 (diagrammatically shown) serves to establish and cut off hydraulic communication between pressure bellows 50–51, upper and lower positioner bellows 70, a miniature hydraulic accumulator 55, and associated hydraulic lines: of which line 52 connects member 50–51 with valve 56, line 53 connects 56 to upper 70, line 54 connects 56 to lower 70, and line 57 connects 56 to 55. Pressure bellows 50–51, upper and lower positioner bellows 70, the hydraulic chamber of valve 56, and accumulator 55, as well as connecting lines 52, 53, 54, and 57, are filled with an incompressible fluid and properly bled as in the practice of hydraulic actuation systems. Thus, a solid column of fluid stands in each of these members. Screws 69 are turned until each engages the base of bellows 70 and are then tightened an additional turn to provide a preload pressure in the hydraulic system. This preload pressure (1) provides firmer contact at both sides of the sliding spool 60; (2) compensates contraction and expansion due to temperature changes; and (3) assists the bellows in re-expanding quickly and regaining the "at rest" position after being compressed by lever 23–24 and/or lever 14–44.

DESCRIPTION OF OPERATION

In operation, the digital actuator is controlled by the digital outputs obtained from the command source (computer or tape reader, etc.) interface circuits. Control signals will actuate valve 56 for right or left position, and a separate data line will connect to each of the torque motors, each representing one bit in the word format.

A typical command will first actuate valve 56 to its right or left position. The other output signals will energize one or more torque motors in the unique combination required to achieve the individual binary weighted displacements whose collective movement will position spool 60, the desired distance in the desired direction.

Suppose, for example, it is desired to move spool 60 to the left. An input signal from the interface unit energizes valve 56 to its first (left) energized position, which thereupon connects upper positioner bellows 70 with control pressure bellows 50–51 and lower bellows 70 (not shown) with accumulator 55, respectively. The binary coded electrical input from the command source interface circuits energizes the command-source-selected torque motors, thus producing discrete lever output strokes. These are summed by upper lever 23–24 and/or lower lever 14–44, thereby depressing and developing in member 50–51 a hydraulic pressure in direct proportion to the binary coded signal. This developed control pressure forces a hydraulic spurt of corresponding magnitude through service port 11, and through line 52 into upper positioner bellows 70, causing it to expand against screw 69 and shift arm 63, thereby shifting master spool 60 proportionately to the left. In shifting toward the left, spool 60 depresses lower bellows 70 (not shown), which in turn discharges its fluid into accumulator 55 now connected to it.

The shifting of spool 60 in proportion to the aggregate of lever stroke displacements dictated by the command source, allows power fluid to pass to a load actuator. The power fluid is derived from a supply source in the conventional manner. The period of time in which this entire operation is carried out is predetermined by the hydraulic capacity, the internal parameters of the digital actuator, and in the outputs from command source interface circuits. At the end of the period, the load has assumed its commanded position and all torque motors and valve 56 are de-energized, with all members back in their respective "at rest" positions. The hydraulic fluid displaced by the depression af bellows 50–51 also rushes back to its "at rest" position. Within the few milliseconds required by valve 56 to return to its null position (and even beyond that) upper positioner bellows 70 forces its additionally held fluid back into control pressure bellows 50–51 by means of its spring property and with the aid of coacting members: lower positioner 70 and accumulator 55, which tend to return to their "at rest" positions since the pressure exerted against them has been removed. Thus, during this same period of time, accumulator 55 returns the fluid it has received to lower positioner bellows 70 via valve 56. In its null position, valve 56 permits the communication of all the members connected to it by means of its underlapped by-pass feature.

The over-all response time of the digital actuator is estimated to be a few decades of milliseconds. If spool 60 is to be moved toward the right, on command from the command source, valve 56 assumes its second energized position (right), thereby connecting lower positioner bellows 70 with control pressure bellows 50–51 and the upper positioner bellows 70 with accumulator 55, respectively. As commanded hydraulic pressure and spurt are developing, lower bellows 70 expands and upper bellows 70 contracts. As the torque motors and associated levers operate in the same manner for both left and right commands to valve 56, they now cause a shift of spool 60 to the right.

In its null position, spool 60 is precisely centralized and held clamped by two screws 69. Should some spurious pressure develop in either positioner bellows, this will be instantly transmitted to the other positioner and into the entire pilot hydraulic system through valve 56. Here all pressures are neutralized by the counterpoising of upper and lower positioners 70 and the by-pass feature of valve 56. Thus, spool 60 will not move until valve 56 is energized.

In a ten-motor actuator, lever 14–44 will be, as stated above, a singletree-type and the ratio of its segments 44 and 14 will be two to one. As a consecutive binary power unit following unit H, the motor depressing at point 46 must produce a fluid displacement twice as great as the spurt generated by the depression at point H. If in the control pressure bellows the diameter of the larger portion 50 is twice that of the small portion 51, then an equal depression at 49 will produce a spurt four times as great as at 20 and 26. Thus, to produce the desired spurt volume displacement $(1.28 \times 2/4) \times 3 = 0.64 \times 3 = 1.92$ mm. Thus, point 46 of segment 44 must be depressed 1.92 mm. Therefore, the motor strokes at points 45 and 46 must each be 1.92 mm.

The ten-motor digital actuator can assume $1024-1=1023$ active discrete positions (one position being the "at rest" position) with the same number (1023) of depression units. Under normal conditions, with all 1023 depression units applied, spool 60 will execute its maximum (or full) stroke towards the right or left and the load will be driven to its full travel in a determined response time. For example, if the full stroke of spool 60 to one side is a half inch, the movement due to one depression unit is $0.5 1023 = 0.000488$ inch. To move the spool and the load half the total travel, the motor at 45 only is energized, whereby 512 units are applied (which is substantially half of 1023). If only one third of the full span is required, then 341 depression units must be applied. The motors to be energized are selected by the command source as follows: the first selected is always the one yielding the highest output under the required total quantity, which in this case is the motor at 46, whose output stroke is $1.92 \times 1/3 \times 4 = 256$ units. This leaves a first remainder of 85 units; then, the highest for the 85 total is that at G (64) leaving a second remainder of $85-64 = 21$; then the motor at E(16), leaving a third remainder $21-16 = 5$; then the motor at C(4), and finally the motor at A (1). Summarizing, motors 46, G, E, and A are energized, their respective contributions adding up to the sum of 341 units, which is 1/3 of the full span of the device.

After the load and the load actuator are moved correspondingly, they remain at their last position while the motors and valve 56 are de-energized and with spool 60 return to their "at rest" positions.

It is important to note that the conversion of the digital command from the command source to a corresponding analog movement is performed with high precision by means of the lever arms exclusively. Adjustable followers 43 serve to take up any slack between the several levers and up to the final depression point 20 or 49. There is no backlash or lost motion such as is found in certain stepping mechanisms. The arrangement is insensitive to and hence unaffected by, any variable, including temperature, pressure, contamination, etc. The process of summing the binary values is undeviatingly correct and the result mathematically exact.

It is also important to note that said provided high precision analog movement is instantly and directly executed with equal accuracy. The lower spool 60 is at all times actually clamped (as stated above) between the two positioner bellows which drive it by two solid hydraulic columns. Thus spool 60 is prevented from overshooting and/or undershooting. In addition, the aforesaid preloading feature of the positioner bellows and the underlap of valve 56 in conjunction with the precision analog movement, will cause the spool 60 to find the exact position in one-shot operation regardless of frictional resistance or any other variable, no hunting being involved.

Figure 7:
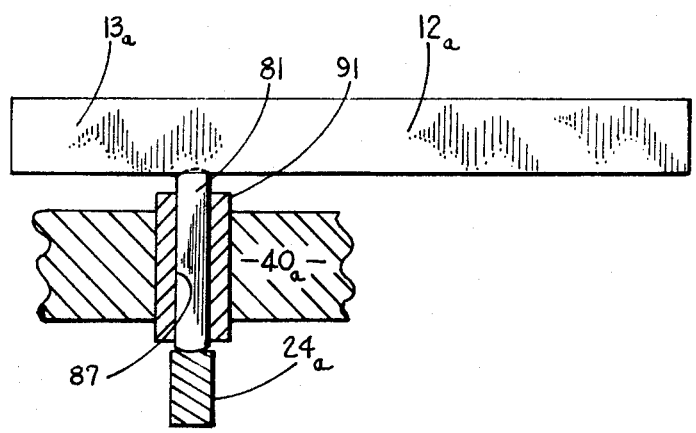
FIG. 7 is a, somewhat enlarged, fragmentary view of the embodiment of FIGS. 5 and 6.
Figure 5:
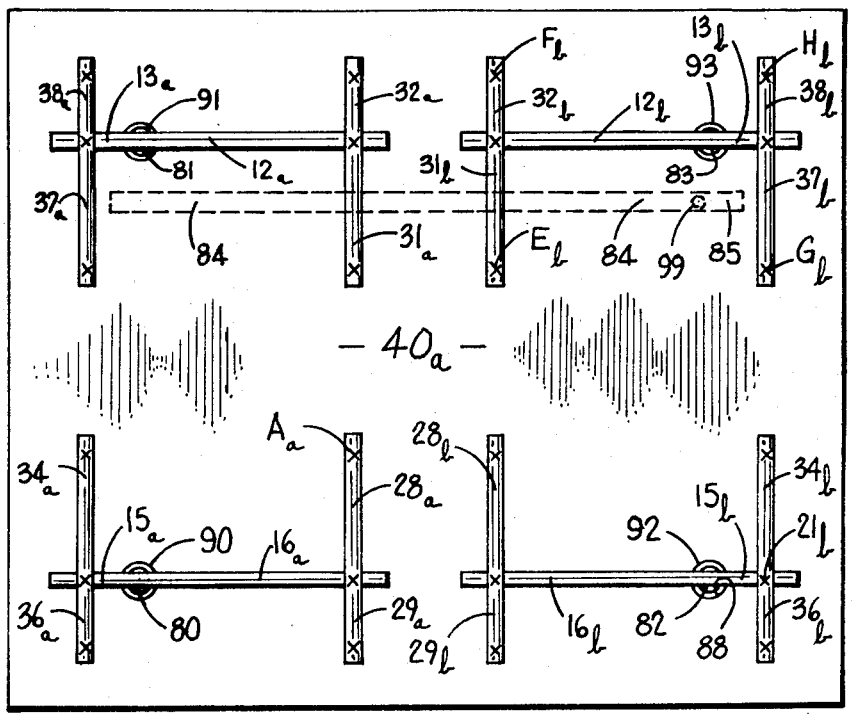
FIG. 5 is a view like FIG. 1, but showing another embodiment which adds up, purely by lever means, the reduced strokes of two series of on/off switching power units without the use of the double-ended pressure chamber.
Figure 6:
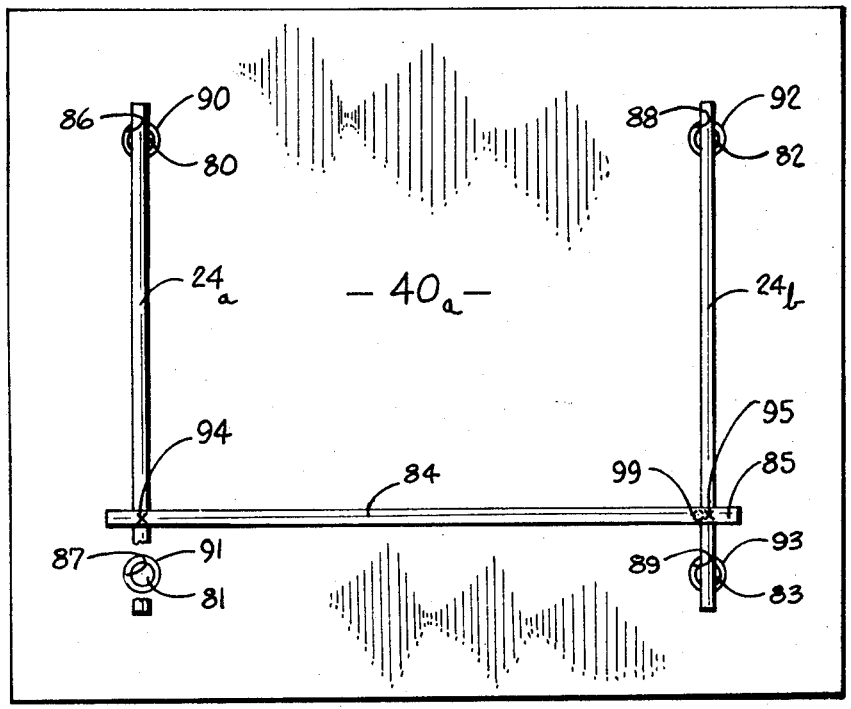
FIG. 6 is a bottom view of FIG. 5.

FIGS. 5, 6 and 7 illustrate an embodiment of the invention capable of assuming up to $2^{16}(65,536)$ discrete output positions merely through the lever means. The need for control pressure bellows 50–51, as for summing the outputs of different levers, is obviated here. To achieve this kind of fine resolution in the present practice, several control units are employed connected in cascade; or several arms of a Wheatstone-like hydraulic bridge are employed... The present version of this invention, the all-lever version, employs merely one control unit. In the invention of FIGS. 5, 6 and 7, the coactive elements other than bellows 50-51 and line 52, are constructed and arranged in a form similar to that of the invention first above described in FIGS. 1 and 2. Here, likewise, the majority of lever members are foremost levers, accepting actuation strokes at both ends only from power units, whereas the rest of the levers, both intermediary and summing, accept actuation movements only from preceding levers.

This provision of accepting movements only from other preceding levers offers a big advantage in structure and in operation. When an on/off power unit is energized it delivers a finite rated stroke, which, in binary scale, is either equal to its preceding stroke or twice as great.

The ratio of the segments of the lever accepting this power unit stroke perforce must be one-to-two as for the foremost levers. The actuation by preceding levers obviates this restriction. The segments ratio can be selected and arranged at any high order binary power as needed. This will be understood as the description and operation of this version are followed. The parts similar to those in said FIGS. are designated by the same characters followed by the distinguishing subscript $a$, $b$, $c$, or $d$.

Item $40_a$ is a similar backing plate operatively supporting, on its drive side, first-order intermediary (doubletree-type) levers $12_a$–$13_a$ and $15_a$–$16_a$ in its upper stage left bank, in addition to $12_b$–$13_b$ and $15_b$–16 in its upper stage right bank. These four intermediaries have a foremost lever with a pair of torque motors (not shown) at each end. All of the foremost lever members (8 of them in FIG. 5) are disposed in a first common plane on the drive side (upper stage) of the plate $40_a$ and the intermediary levers support the foremost levers by direct physical contact and are disposed in a second common plane on the drive side. These are constructed, proportioned and disposed for coaction in the same manner as above-described for levers 12–13 and 15–16 in FIGS. 1 and 2.

Plate $40_a$ has four holes 86, 87, 88, and 89 with four guides 90, 91, 92, and 93 forced fit therein and traversing from its one side to the other. Four transmission rods (or propping links) 80, 81, 82, and 83 slidably reciprocate in these guides. The aforesaid four levers $12_a$–$13_{b7}$, $15_a$–$16_a$, $12_b$–$13_b$, and $15_b$–$16_b$ bear on the upper ends of these links, and each one transmits its reduced linear stroke, via its transmission rods, to the lower stage underneath plate $40_a$ for further reduction. The two transmission links of the left bank support and actuate, at the lower stage, the summing-side second order intermediary lever $23_a$–$24_a$; in like manner, the two transmission links of the right bank support and actuate lever $23_b$–$24_b$. In turn, the latter levers actuate the new output summing lever 84–85. The ratio between segments of each coacting lever of this version, up to the receiving points of new lever 84–85 of FIGS. 5 and 6, is the same as that of its counterparts of FIG. 1. This is true equally for the left bank and for the right bank of levers. These network of levers actually comprises two separate identical devices of FIG. 1 compounded by lever 84–85.

For reasons of simplicity and ease of computation, the following stroke ratings are selected in this example:

the rating of the first and smallest quartet of motors is 4.3875 mm;

the second quartet has a rating double that of the first, or 8.775 mm;

the third quartet has twice that of the second, or 17.55 mm; and the fourth quartet has twice that of the third, or 35.1 mm. It is of interest to note here that all the levers in this invention are similar in structure and configuration; all are stroke-reducing members; they all have only two ends with a receiving point at each end. Between said two ends there are a plurality of divider points which can divide the effective length of the lever on a binary basis. As to the State-of-the-Art, heretofore it has been possible to use only the first one of these points, thus giving a one-to-two or two-to-one ratio.

The present invention makes it possible to employ anyone of these binary dividers and thereby establish the above-mentioned high order segment ratio. In fact, anyone of these divider points may be chosen and employed as required. Both ends of the intermediary and summing levers accept actuation movements from their associated preceding levers. A preceding lever may be a foremost lever or another intermediary lever. Each preceding lever may transmit a differently reduced single stroke or a different sum of binary-weight reduced strokes whereby the consecutive binary scale reduction — namely the ratio of two-to-one (2:1) or one-to-two (1:2) — is obviated for these levers.

High order binary-scaled reduction through a single lever is thus made possible. The smallest reduction is obtained from the stroke at point $A_a$ of the first quartet. Its stroke rating, as transmitted to lever 84–85, has been decreased by the factor 135. The ratio of segment 85 to segment 84 is the ratio of 64 to 1. Thus, the subject rating is further scaled down by 65, and a discrete output stroke of 4.3875(135×65)=0.0005 mm is transmitted to the final linear output point 99 of lever 84–85. The half of one thousandth millimeter is the minimum movement as well as the linear output unit in the present example. This linear unit is doubled, quadrupled, octupled, etc., in a binary manner or pattern for each consecutive motor stroke.

The maximum linear output is produced by the last motor, at point $H_b$. Its stroke reduction scale produces 35.1(135/64×65/64)=mm linear motion at the output point 99; whereas the whole 16 motor network produces a motion of 16.384 × 2 = 32.768 mm. Between zero and its full stroke output of 32.768 mm, this single control unit assumes, as stated above, $2^{16}$ (65,536 thousandth millimeter apart from one another.

When less numerous positions are preferred, then the highest output singletree $G_b$–$H_b$ and its two motors are omitted and a new motor of 35.13=11.7 mm is disposed at point $39_b$.

Now, a full stroke output of (11.7×4×8×64×2/9×5×65)=16.384mm is obtained by $2^{15}$(32,768) discrete positions. In a fourteen motor device, singletree $E_b$–$F_b$ and its two motors also are omitted and lever member $12_b$–13 which until now was a doubletree is now converted to singletree, and the ratio between its two segments must be changed to 2 to 1. A motor of 7.02 mm is adapted at each end, and a full stroke output of 7.02×2×8×64×2/3×9×65=8.192 mm is obtained through $2^{14}$(16,384) discrete output positions. In a further step, lever $12_b$–$13_b$ is eliminated, and instead a motor of (7.023)=2.34 mm is placed at point $23_b$ yielding a full stroke output of 4.096 mm through $2^{13}$(8,192) positions as a result.

By continuing to reduce the number of motors in the manner just described, a nine motor unit would have merely one motor of 0.13 mm in the right bank acting on the right end of lever 84–85. No other levers as singletrees or doubletrees would be necessary. The full stroke output would be 0.256 mm with $2^9$(512) discrete output positions. It is obvious that these given figures as well as the torque ratings may be multiplied by any number and have the desired result. It may be readily noted that the backing-plate and associated connecting rods and links operatively support all the levers and power units. The use of a housing is obviated here. The device has an exposed structure, affording visible operation, and offering quick and easy access for inspection, adjustments, and repair.

What is claimed is:

1. In an electromechanical control system, coacting lever network means comprising a plurality of foremost lever members disposed in a first common plane half as many intermediary lever means disposed in a second common plane, said foremost levers being in direct physical contact with and operatively engaging said intermediary levers, said lever network having a plurality of receiving points and a single final point of linear force outputs, means backing-plate means and associated connecting rods for operatively supporting said lever network in an exposed arrangement, the receiving points of said foremost levers being in supporting and actuating engagement with on/off-type stationary power unit means having linear stroke ratings, and said stroke ratings being scaled down, through said coacting lever network, to discrete binary values and summed together at said final output point.

2. The control device of claim 1, wherein
said lever network means further comprises at least one summing lever means having said final output point,
each of said lever members being longitudinal with only two ends, a receiving side with a receiving point at each end and a transmission side with a selective transmission point thereon,
said transmission point theoretically dividing each of said lever members into a major and a minor segment,
thereby establishing a first ratio between the entire effective length of said lever members and the effective length of said major segment, and a second ratio between the entire length and the minor segment,
thereby when a first on/off power unit is activated its stroke is reduced by said second ratio to a first fraction thereof, and is so applied to said transmission point, and
when a second power unit is activated its stroke is reduced by said first ratio to a complementary fraction thereof and is so applied to said transmission point, and
when both power units are activated the sum of the two complementary fractions of stroke, that is a whole stroke, is applied to said transmission point,
the length of said major to that of said minor segment, for said foremost levers, having a fixed ratio of substantially two-to-one (2:1),
said length ratio for said intermediary levers being substantially four-to-one (4:1),
said ratio for said summing lever being substantially eight-to-one (8:1).

3. The control device of claim 1, wherein
each of said intermediary and said summing levers is engaged at both ends only with levers, accepting strokes only from said engaged levers, and thus it is capable of accepting two different sums of varying binary-weighted strokes at its two ends,
thereby obviating the need of a consecutive binary reduction and permitting each said lever member to assume non-successive, high order binary stroke-reduction, and
said backing-plate and connecting rods support said lever network in an exposed arrangement.

4. In an electromechanical control system at least one group of coacting lever member means,
each having a receiving side with a receiving point at each end,
a transmission side with a plurality of selective transmission points thereon,
a summing lever, in said group, whose selected transmission point is a final output,
intermediary lever member means in said group being operatively disposed, in pseudo-crisscross manner, in direct physical contact with both receiving points of said summing lever, and
a series of foremost lever members disposed in direct physical contact with and operatively engaging the receiving points of said intermediaries,
each end of each of said foremost levers being in supporting and actuating engagement with on/off-type power unit means,
said power units having linear stroke ratings,
a backing-plate means and associated connecting rod means operatively supporting said group of lever means and said power unit means,
any given foremost lever swinging towards the final output, when the power unit of one of its ends is energized, by swaying on its none-energized end,
the entire lever being shifted towards said side and the entire linear stroke motion being transmitted to a subsequent lever member when the power units of both ends of said given foremost lever are energized,
said selected transmission points, said linear stroke ratings of on/off power units, and said coacting lever members being so arranged, proportioned, and constructed that said stroke ratings are reduced to discrete binary values and summed together at said final output point.

5. The control device of claim 4, wherein
each of said intermediary and said summing levers is engaged at both ends only with levers, accepting strokes only from said engaged levers, and thus it is capable of accepting two different sums of varying binary-weighted strokes at its two ends,
thereby obviating the need of a consecutive binary reduction and
permitting each said lever member to assume non-successive, high order binary stroke-reduction, and
said backing-plate and connecting rods support said lever network in an exposed arrangement.

6. The control system of claim 4, wherein said backing-plate means further comprises,
at least two transmission link means traversing from one side to the other of said backing-plate,
said lever means being compound lever means,
an output summing lever with a right intermediary lever member and a left intermediary lever members operatively disposed at a lower stage underneath said backing-plate,
at least two foremost levers and half as many intermediary levers disposed in one bank of the upper stage above said backing-plate,
at least one foremost lever and half as many intermediary lever members disposed in another bank of said upper stage,
said intermediaries of both upper banks transmitting said linear stroke motions to the lower stage intermediaries via said transmission link means.

7. In a direct digital control system the combination of claim 6 wherein
said connecting rod means further comprises adjusting means for taking up any lashes or slacks between all the elements of said coacting lever members, said power units, and the point where said linear force output is applied,
thereby providing a lashless operation for said control system,
said transmission point theoretically dividing each lever member into two segments of unequal lengths,
all of said foremost lever members in said both banks having a substantially two-to-one (2:1) segments length ratio,
said upper intermediaries having a four-to-one (4:1) segments length ratio, and lower intermediaries having eight-to-one (8:1) segments ratio, and said summing lever having a segments ratio of sixty-four-to-one (64:1), each stroke rating received from a power unit being relayed and transmitted to the final output point through more than one of said lever members, each acting lever member en route the output point executing its share of reduction, with the stroke rating thus being transmitted to said output point in a predetermined binary value.

8. In an electromechanical control system, a coacting lever network means, a backing-plate means and associated connecting rod means operatively supporting said lever network means, a group of lever members disposed and arranged in a left bank and a right bank on a drive side of said backing-plate, and another group of levers disposed and arranged on a summing side, opposite to said drive side, each of said levers being longitudinal with only two ends and having a selective transmission point, said lever network comprising in combination, a summing lever member extending on the summing side from said one bank to the other and whose transmission point is a final output, a pair of summing-side intermediary lever members, one disposed in the left bank on one end and in direct physical contact with said summing lever, and the other similarly disposed on the other end in the right bank, a pair of drive-side intermediary levers disposed in said left bank, two pairs of foremost lever members in said drive side left bank, each one operatively disposed on one end and in direct physical contact with said drive-side intermediaries, said associated connecting rods engaging each end of said foremost levers and extending through said backing-plate, a pair of transmission link means traversing from the drive side to the summing side of said backing-plate, each end of each foremost lever being in actuating engagement with an on/off-type power unit of linear stroke rating, the foremost lever member reducing said stroke rating and transmitting same through its transmission point to its drive-side intermediary lever, the latter transmitting the stroke with a further reduction to said left summing-side intermediary via a transmission link, the last-mentioned intermediary transmitting to said summing lever, and the summing lever in turn to its output point with successive reductions, each stroke being thereby reduced to a discrete binary value and summed at said output point, at least another pair of foremost lever members disposed in the right bank of the drive side, transmitting likewise their strokes to said right summing-side intermediary via other transmission links.

9. The control mechanism of claim 8, wherein said summing lever, said intermediary levers, and said foremost levers are binary stroke-reducers, each of said network levers reducing said rated stroke accepted at either end, said ends reducing said stroke by different factors, the magnitude of said factors depending on the selected position of said transmission point, the ratio between said two different factors being the first power of two (2:1) for each single member of said plurality of foremost levers, the ratio for each single member of said drive-side intermediary levers being the second power of two (4:1), the ratio for each single member of said summing-side intermediaries being the third power of two (8:1), thereby said members cause a correspondingly high order binary stroke reduction, said ratio for said summing lever being the sixth power of two 64:1), whereby said member causes a correspondingly high order stroke reduction, each of said foremost and intermediary levers preceding an associated lever to accept its reduced stroke, said summing lever and said intermediaries accepting strokes only from said preceding levers, thereby rendering both ends of each of said summing and intermediary levers capable of accepting two different sums of said reduced strokes, said foremost levers accepting strokes only from said on/off power units.

10. In the control mechanism of claim 8, said connecting rod means further being provided with an adjustable follower for each rod, said on/off power unit engaging said follower and actuating the end of said foremost lever through said connecting rod, each foremost lever having two on/off power units, one power unit for one end, another power unit for the other end, each individual lever of said plurality of lever members having substantially equal actuating strokes at both its ends, all of said foremost levers being disposed in a first common plane and being substantially parallel with one another, said drive-side intermediary levers being disposed in a second common plane and being substantially parallel with one another.

11. The control mechanism of claim 8, wherein each of said transmission link means comprises a transmission rod slidably reciprocating in a guide inserted in a hold provided through said backing-plate, said backing-plate being further provided with other holes to operatively receive and guide said connecting rods, said on/off power units being supported by said backing-plate.

12. In an electromechanical control system, a coacting lever network means, a backing plate means and associated connecting rod means operatively supporting said lever network, each lever member of said network being longitudinal with only two ends and having a plurality of selectible transmission points between said two ends, each of said points causing binary division of the effective length of each lever into two unequal segments, the ratio between the lengths of said segments optionally depending on the selection of said binary-wise divider point, each lever member of said network serving to reduce binary-wise a linear stroke received at either end and transmit said stroke through said selected transmission point, the majority of said lever members being foremost levers with a one-to-two (1:2) segments length ratio, each end of each of said foremost levers being in supporting and actuating engagement with on/off-type power unit means having linear stroke rating, said foremost levers transmitting binary-wise reduced strokes to first-order intermediary levers having a one-to-four (1:4) segment length ratio, said first-order intermediary levers transmitting their output strokes to second-order intermediary levers having a one-to-eight (1:8) segment length ratio, said second-order intermediary levers transmitting their output strokes to a summing lever having a one-to-sixty-four (1:64) segment length ratio, the transmission point of said summing lever being a final output, the stroke of each power unit being thereby reduced to a discrete binary-weighted value through said lever members and transmitted to said final output.

13. The control device of claim 12, wherein each of said intermediary and said summing levers is engaged at both ends only with levers, accepting strokes only from said engaged levers, and thus it is capable of accepting two different sums of varying binary-weighted strokes at its two ends, thereby obviating the need of a consecutive binary reduction and permitting each said lever member to assume non-successive, high order binary stroke-reduction, and said backing-plate and connecting rods support said lever network in an exposed arrangement.

* * * * *